(12) United States Patent
Chongoushian et al.

(10) Patent No.: US 10,541,763 B1
(45) Date of Patent: Jan. 21, 2020

(54) APPARATUS AND METHOD FOR DIGITALLY CHARACTERIZING COMMUNICATION CHANNEL NOISE AND INTERFERENCE

(71) Applicant: BAE SYSTEMS Information and Electronic Systems Integration Inc., Nashua, NH (US)

(72) Inventors: John H Chongoushian, Emerson, NJ (US); James W Lang, Wayne, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/406,737

(22) Filed: May 8, 2019

(51) Int. Cl.
*H04B 3/46* (2015.01)
*H04B 17/00* (2015.01)
*H04Q 1/20* (2006.01)
*H04B 17/336* (2015.01)
*H04L 27/26* (2006.01)

(52) U.S. Cl.
CPC ....... *H04B 17/336* (2015.01); *H04L 27/2649* (2013.01)

(58) Field of Classification Search
CPC ...... H04B 17/336; H04B 17/29; H04B 17/15; H04B 17/0082; G11B 5/455; G01R 31/3171
USPC ......................................... 375/224, 227, 228
See application file for complete search history.

(56) References Cited

U.S. PATENT DOCUMENTS

| 6,813,477 | B1 * | 11/2004 | Harris | H04B 17/0082 455/115.2 |
| 7,251,574 | B1 * | 7/2007 | Bhattacharya | G01R 31/3171 398/158 |
| 9,208,805 | B1 * | 12/2015 | Ow | G11B 5/455 |
| 2009/0098868 | A1 * | 4/2009 | Cheng | H04B 17/15 455/425 |
| 2014/0119421 | A1 * | 5/2014 | El-Hassan | H04B 17/29 375/227 |

\* cited by examiner

*Primary Examiner* — Phuong Phu
(74) *Attorney, Agent, or Firm* — Maine Cernota & Rardin

(57) ABSTRACT

A wireless receiver and method of wireless communication determines levels of noise, including interference, in communication channels without need of calibration. A digital test signal is digitally added to digitized noise, and a signal-to-noise-and-interference (SNIR) value is determined from a resulting bit error rate and/or message error rate. The level of noise is then determined from the SNIR. The amplitude of the digital test signal is adjusted to cause the SNIR to be sensitive to the noise level, which can require an SNIR between 1 dB and 10 dB. The system can include a digital test signal generator, or the digital test signal can be stored in a memory. The system can further include a channelizer, demodulator, data correlator, decryptor, and message assembler. Noise and interference level determinations can be used to select an optimal communication channel, and to adjust a transmission power and/or rate to suitable values.

20 Claims, 3 Drawing Sheets

APPARATUS AND METHOD FOR DIGITALLY CHARACTERIZING COMMUNICATION CHANNEL NOISE AND INTERFERENCE

FIELD

The disclosure relates to wireless communication, and more particularly to apparatus and methods for characterizing channel noise and interference experienced by a wireless communication system.

BACKGROUND

It is well known that accurate reception of wireless communications can be affected by ambient noise that is present in the frequency band or "channel" in which the communication is transmitted. In addition, signal reception can be further impeded by interference that arises from various sources, including unshielded electronic devices, electric motors, and other wireless transmitters. The latter category can arise from inadvertent transmissions, such as another system innocently transmitting at the same frequency, or at a lower frequency that gives rise to an interfering harmonic. Interference can also be malicious, for example in a combat environment where hostile forces intentionally attempt to jam communications. The degree of interference, especially of malicious interference, can change frequently for each frequency channel.

Often, wireless communication systems are able to adjust their transmit power so as to overcome ambient noise and interference. Furthermore, many wireless communication systems, including cognitive radio systems, are able to transmit and receive messages over more than one frequency band, referred to herein as a communication channel, such that it can be important to select the available communication channel that has the lowest noise and interference. Accordingly, rapid and accurate characterization of the noise and interference that is present within a communication channel, and a corresponding estimation of the transmission power that is necessary to avoid undue communication performance loss, can be important to successful wireless communication of signals of interest.

With reference to FIG. 1, if the noise and interference in a given channel is relatively constant, and if there is a known time period when the signal of interest is not present at the receiver, one method of providing an estimate of the performance loss in a communication channel is to couple the received noise and interference 104 with a local representation of the signal of interest, i.e. an analog "test" signal 102 that is generated by an analog test signal generator 106 and adjusted by a gain control 108 to a known amplitude. The analog test signal 102 is introduced into the wireless receiver 100 together with the received interference 104, and the receiver 100 attempts to successfully receive the test signal 102. An appropriate metric, such as a bit error rate, correlation score, etc., can then be used to assess the level of impairment in the communications channel.

It is important that the analog test signal 102 should be approximately equal in amplitude with the received interference 104, because a very strong analog test signal 102 will likely be received without errors, while a very weak analog test signal 102 will likely not be received at all. A disadvantage of the above method is that an analog loopback path including a coupler 110 and mixer 112 must be provided in the receiver hardware 100. Furthermore, the test signal 102 that emerges from the gain control 108 must be precisely and frequently calibrated.

What is needed, therefore, is a system and method of rapidly and accurately characterizing noise and interference that are present in a receiver channel without requiring precise and frequent calibration of test apparatus.

SUMMARY

The present disclosure is a system and method of rapidly and accurately characterizing noise and interference that are present in a receiver channel without requiring calibration of test apparatus.

Modern communication receivers are typically digital receivers, in that they digitize the received waveform at an early stage, either at the received frequency (wideband) or at an intermediate frequency or "IF" (narrowband). Often, the signal is quadrature detected, resulting in both In-Phase (I) digital sample values and Quadrature (Q) digital sample values that are directed to digital hardware logic for further signal processing, including channelizing (essentially digital bandwidth filtering) demodulation (essentially conversion from measured pulse amplitude and phase values into received "symbols") and data correlation (extraction of received bits from the demodulated symbols).

The present disclosure utilizes the fact that the Bit Error Rate (BER) output from a data correlator in a digital receiver is correlated to the signal to noise-and-interference ratio (SNIR) of the signal as received at the antenna or other input. Rather than injecting an analog test signal into the input of the receiver, the present disclosure injects a digital test signal downstream of the digitizer, determines the BER of the received data bits and/or the error rate of a received message, compares the BER and/or message error rate to a known performance curve of BER vs. SNIR and/or message error rate vs. SNIR to determine the SNIR for the receive channel, and calculates the noise and interference of the receive channel by dividing the known test signal level by the SNIR. The process can then be repeated for a plurality of available communication channels so that the channel with the lowest noise and interference can be selected for communication, and/or a transmission power can be adjusted so as to ensure successful communication, According to the present disclosure, the receiver includes an analog signal input through which electromagnet energy enters an analog stage or "front end" of the receiver (including a preamplifier, filter, and possibly an IF mixer and IF amplifier) that has linear gain across the frequency range of the channel to which the receiver is tuned (in the case of a wideband receiver) or across a suitable IF bandwidth (in the case of a narrowband receiver). The analog front end is followed by a digital stage that includes a digitizer (A/D converter) that digitizes the detected analog signal energy, typically providing quadrature, digital "IQ" data from which a demodulator attempts to extract symbols representative of a received signal of interest. Embodiments further include a channelizer that excludes any received input that lies outside of the selected channel, as well as a data correlator that extracts message data bits from the symbols, a message assembler that assembles a representation of the transmitted message from the data bits, and in embodiments also a decryptor that decrypts the data bits if they are encrypted.

In embodiments, the receiver further includes a digital test signal generator that generates a digital test signal. In other embodiments, the digital test signal is separately generated, and is stored in a non-transient memory. Because the amplitude and message content of the digital test signal are accurately known, a digital signal gain controller can accurately adjust the amplitude of the digital test message to a precisely known "test input level" simply by multiplying the digital test signal by a specified gain factor. Accordingly, there is no need, according to the present disclosure, for calibration of the test signal. Once the test signal is generated, or retrieved from memory, and adjusted to a desired digital amplitude, it is "injected" into the receiver system simply by adding it to digitally sampled noise and interference that is received during a period when no signals of interest are present in the selected channel. In embodiments, this step of injection (by addition) of the digital test data occurs at the input of the demodulator.

Presuming that the analog front end is operating in its linear range, the digitized noise and interference data, combined with the digital test signal, can then be used to determine one or more impairment metrics. For example, the bit error rate ("BER") of the data correlator output can be compared to a known performance curve of BER vs. SNIR to determine the SNIR for the receive channel. In addition, or alternatively, the message output of the message assembler can be used to determine the SNIR. The noise and interference level of the receive channel can then be calculated by dividing the known test signal level by the SNIR. Depending on the application, this procedure can be repeated for each available communication channel, after which signals of interest can be transmitted and received using the channel that has the level of noise and interference. In the alternative and/or in addition, the transmission power can be adjusted according to the determined noise and interference level.

It should be noted that the present disclosure is well suited for signal intelligence (SIGINT) applications that operate in high interference environments. Further applications include identification, friend or foe (IFF) where there is a need to extract communication signals from RF energy received in hostile environments.

A first general aspect of the present disclosure is a wireless receiver configured to receive a transmitted message. The receiver includes an analog input, a digitizer configured to digitize analog energy that enters the receiver via the analog input, said digitized analog energy being digitized noise and interference when a signal of interest is not included in the analog energy, a digital test signal source, configured to provide a digital test signal having a known amplitude and message content, a digital signal gain controller, configured to adjust the digital test signal amplitude to a test input amplitude, a signal combiner, configured to combine the adjusted digital test signal with the digitized noise and interference so as to create digital input data, a data correlator configured to extract transmitted message bits from the digital input data, and a correlation statistics generator configured to determine a bit error rate of the symbols extracted by the data correlator by comparing the bits extracted by the data correlator with the known message content of the digital test signal.

Embodiments further include a channelizer configured to limit the digitized analog energy to digitized energy that falls within a selected receiver channel.

Any of the above embodiments can further include a demodulator configured to extract symbols from the digital input data, said transmitted message bits being encoded in the symbols.

Any of the above embodiments can further include a decryptor configured to decrypt the data bits extracted by the data correlator.

Any of the above embodiments can further include a message assembler configured to reconstruct a received message from the data bits extracted by the data correlator, the received message at least approximating the transmitted message. Some of these embodiments further include a message error rate calculator configured to determine a message error rate of the received message by comparing the received message with the known message content of the digital test signal.

In any of the above embodiments, the digital test signal source can be a digital test signal generator that generates the digital test signal.

In any of the above embodiments, the digital test signal source can be a memory configured for storing a non-transient copy of the digital test signal.

In any of the above embodiments, the digitizer can be a quadrature digitizer.

A second general aspect of the present disclosure is a method for communicating over a wireless communication channel in which noise and interference are present. The method includes the following steps:

a) selecting an available communication channel;

b) during a time period when no signal of interest is present in the selected communication channel, receiving analog noise and interference;

c) digitizing the analog input to create a digitized noise and interference;

d) combining the digitized noise and interference with a digital test signal to form digital input data, the digital test signal being adjusted to a specified amplitude and having a known message content encoded as known message bits;

e) extracting message information from the digital input data;

f) determining a signal to noise and interference ratio (SNIR) of the digital input data by comparing the extracted message information with the known message content of the digital test message;

g) determining a noise and interference level of the selected channel from the determined SNIR;

h) if the determined SNIR does not meet a specified SNIR criterion, changing the specified amplitude of the digital test signal and repeating steps a) through g) until the SNIR meets the SNIR criterion; and i) at least one of:

i.) if there are a plurality of available communication channels, repeating steps a) through g) until a channel selection criterion is satisfied, selecting a one of the plurality of available communication channels according to the determined noise and interference levels, and transmitting a message over the selected communication channel; and ii) transmitting a message at a transmission power and/or a transmission rate that is/are selected according to the determined noise and interference level of the selected communication channel.

In embodiments, step e) includes obtaining received data bits from the digital input data, and step f) includes determining a bit error rate by comparing the received data bits with the known message bits, and determining the SNIR from the bit error rate.

In any of the above embodiments, step e) can include assembling a message from the digital input data, and step f) can include determining the SNIR from a comparison of the assembled message with the known message content of the digital test message.

In any of the above embodiments, step i) can include repeating steps a) through h) for each of the plurality of available communication channels, and step j) can include selecting a channel having a lowest noise and interference level from among the plurality of available communication channels.

In any of the above embodiments, the selection criterion can include a designated maximum level of noise and interference, and step i) can include repeating steps a) through h) until a level of noise and interference for a selected channel is determined to be below the designated maximum level.

Any of the above embodiments can further include channelizing the digitized noise and interference between steps c) and d), wherein said channelizing limits the digitized noise and interference to noise and interference that falls within the selected receiver channel.

In any of the above embodiments, step e) can include extracting symbols from said digital input data by demodulating the digitized noise and interference. Some of these embodiments further include extracting message bits from the symbols by correlating the symbols. Some of these embodiments further include assembling a message from the message bits. And some of these embodiments further include decrypting the message bits before extracting the message.

And in any of the above embodiments, the SNIR criterion can be that the SNIR must be between 1 dB and 10 dB.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
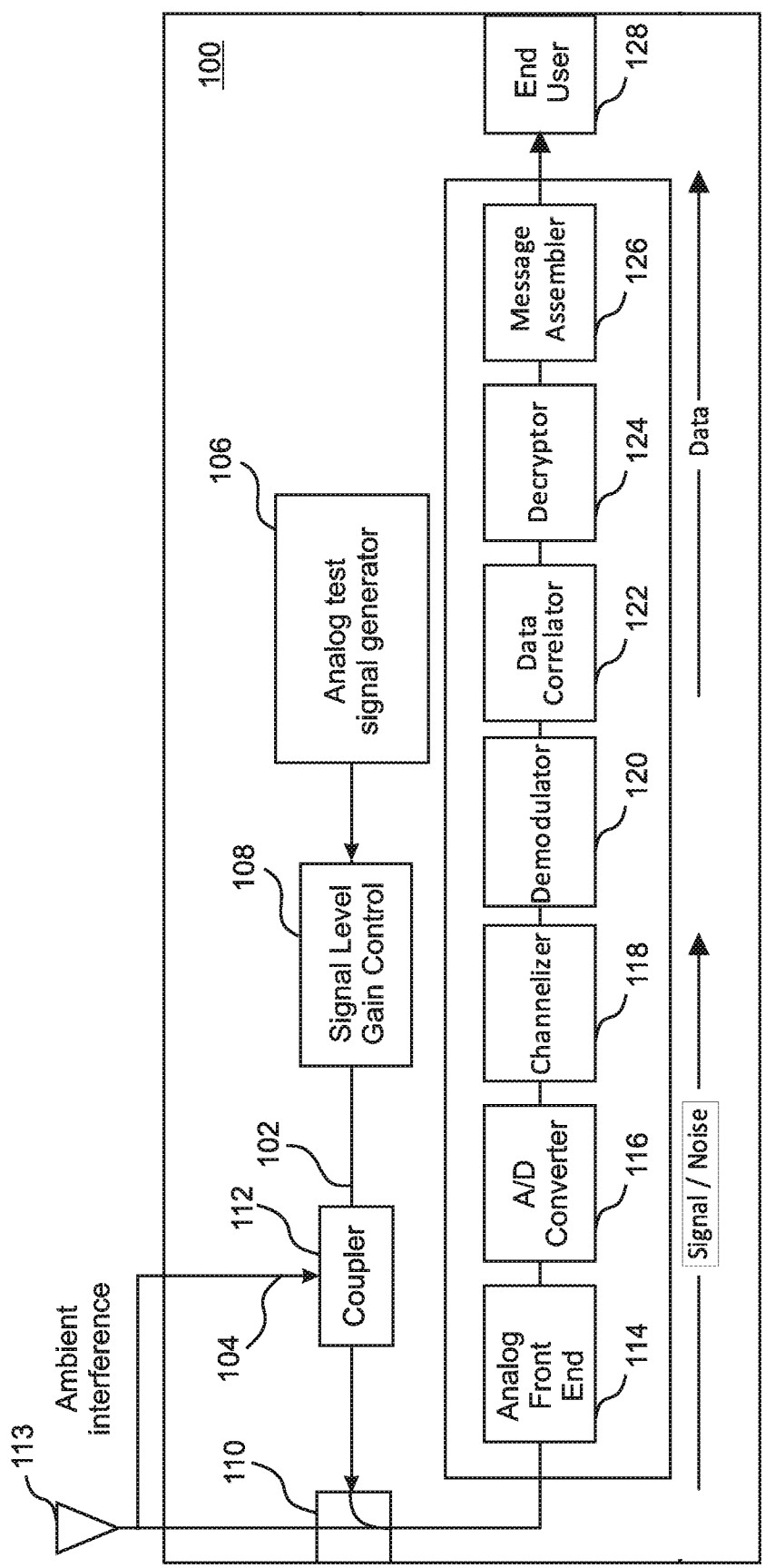
FIG. 1 is a block diagram that illustrates a digital wireless receiver as is known in the prior art.

The present disclosure is a system and method of rapidly and accurately characterizing noise and interference that are present in a receiver channel without requiring calibration of test apparatus.

Modern communication receivers are typically digital receivers, in that they digitize the received waveform at an early stage, either at the received frequency (wideband) or at an intermediate frequency or "IF" (narrowband). Such receivers can be implemented using discrete components, and can also be implemented as a "System on a Chip" ("SoC"). The purpose of a wireless digital receiver is to accept a received signal, which in general includes noise and interference combined with a signal of interest (comprising a modulated carrier wave), and to provide as an output a "cleaned" analog output (such as a voice output) or an error free digital output (if the signal of interest carries digital data), that is an accurate reproduction of the signal of a message transmitted via the carrier wave.

With reference again to FIG. 1, a typical wireless digital receiver can be described as including the following functional blocks:

Analog Signal Input 113—the analog signal input 113 is an antenna or other input from which analog electromagnetic energy (which in general can include signals of interest, noise, and interference) enters the analog front end 114 of the receiver 100.

Analog Front End 114—contains the amplification and filtering circuits that condition and prepare the analog electromagnetic energy so that it can be digitized by the analog to digital converter 116, also referred to as the "digitizer," the "A/D converter" or simply the "ADC." Typically contained in this block is a first-stage Low Noise Amplifier (LNA), also referred to as the preamplifier, which determines the internal noise figure of the receiver. Depending on the receiver design, a mixing synthesizer may also be included (super-heterodyne receiver) and mixed with the signal to convert the signal from the Radio Frequency (RF) at which it is received to an Intermediate Frequency (IF).

A/D Converter 116—converts the analog signal (either at RF or IF), after conditioning by the analog front end 114, into a digital signal. Typically, the digitizer is a quadrature digitizer that produces a digital signal that includes two quadrature components, which are an in-phase component (I), and a "quadrature" component (Q) that is 90 degrees out of phase with respect to the I component.

Channelizer 118—the channelizer 118 accepts the output of the A/D converter 116 and filters it so as to reduce the bandwidth of the signal to its optimal value relative to the communications channel. Typically, the channelizer 118 also "decimates" the signal, i.e. reduces the effective sample rate of the signal. Due to the bandwidth filtering by the channelizer 118, this decimation step does not reduce the information content of the data.

Demodulator 120—the demodulator 120 attempts to extract the symbols or "chips" from the digitized received signal, where the symbols carry the message of interest and are encoded by phase, frequency, and/or amplitude modulation onto the carrier wave. For the purposes of the present disclosure the modulation scheme is described as a digital encoding scheme, such as binary phase-shift keying (BPSK) or Modulation Shift Keying (MSK)), or an analog modulation such as Amplitude Modulation (AM) or Frequency Modulation (FM). However, the present disclosure is not limited to these modulation schemes. The chips can be generated by the entity that transmitted the signal of interest using a direct-sequence spread spectrum (DSSS) encoder. The amount of chips generated by the DSSS encoder determines the processing gain of the signal of interest, which is a tradeoff against the data throughput.

Data Correlator 122—Embodiments include a data correlator 122, which extracts transmitted data bits from the symbols provided by the demodulator 120.

Decryptor 124—Depending on the sensitivity of the information contained in the signal of interest, the transmitting entity may have encrypted the data. If that is the case, then the decryptor 124, included in embodiments of the present disclosure, transforms the data bits from encrypted data ("Cypher Text") into un-encrypted data ("Plain Text").

Message Assembler 126—This is typically the last function in the receiver 100. It reconstructs a received "plain text" message that at least approximates the transmitted message into its original format as a "received message. For example, in the case of a voice communication, the message assembler 126 uses the "plain text" digital data to create and amplify an audio signal that can be heard and understood by the end user or "host" 128. For a digital data communication, the message assembler 126 parses the data into a format that is readable by the host 128. In the absence of noise, interference, and other sources of error, the received message would be identical to the transmitted message.

According to "Shannon's theory," the ability to communicate using radio waves is a function of the bandwidth of the channel and the amount of noise (including interference) that is present in the channel. The receiver designer has the ability to determine the internal noise of the receiver, as is typically determined by the noise figure of the first stage amplifier of the analog front end 114. However, effective communication often requires determining the degree of noise (including interference) that is received by the antenna in each channel, and then using this information to select the best channel for clear communication, select an appropriate transmission power, and/or select an appropriate transmission rate.

Figure 2:
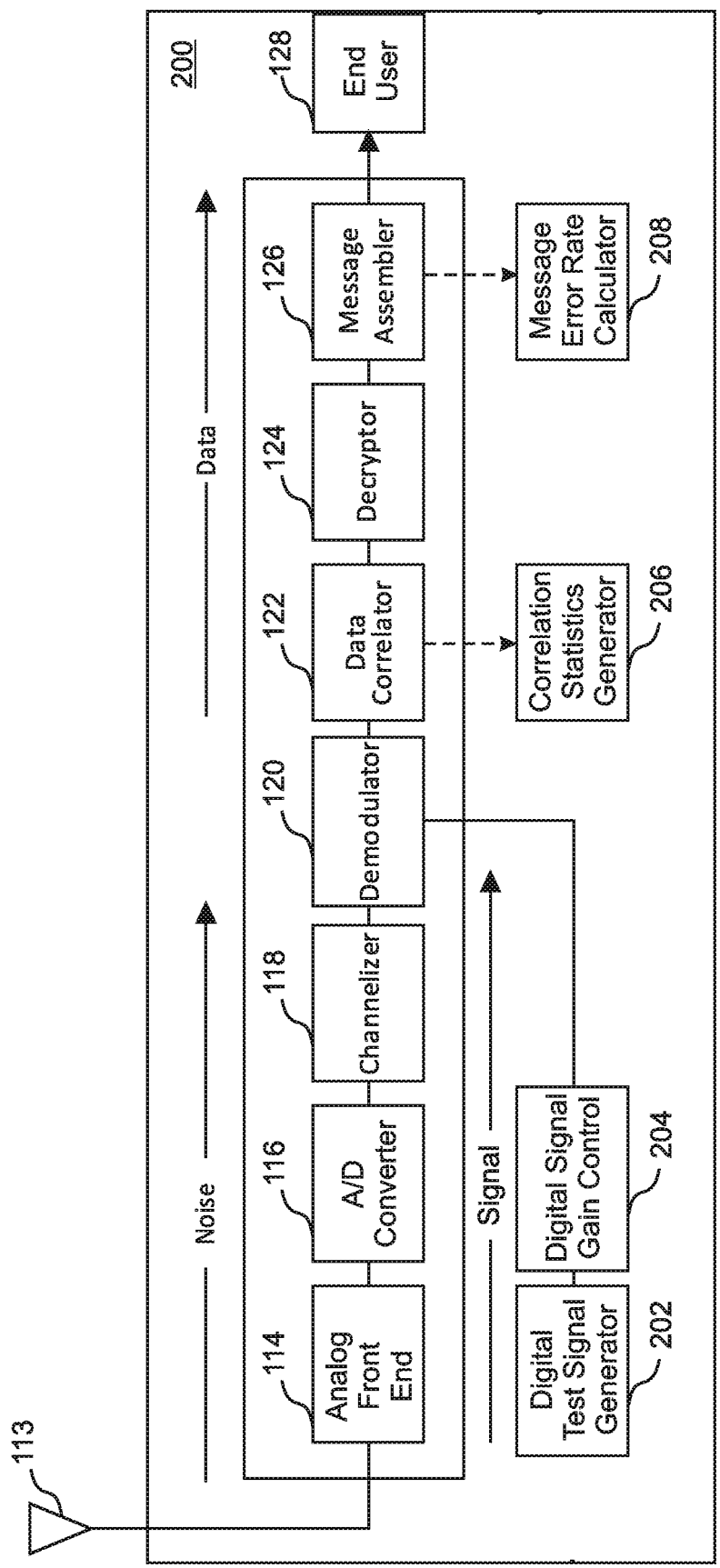
FIG. 2 is a block diagram that illustrates a digital wireless receiver according to an embodiment of the present disclosure.

With reference to FIG. 2, according to embodiments of the present disclosure the receiver 200 includes a series of modules similar to FIG. 1 that receive analog electromagnetic energy and extract therefrom a message of interest if one is present. These modules include an analog signal input 113, an analog front end 114, an A/D converter 116, a channelizer 118, a demodulator 120, a data correlator 122, a decryption unit (in embodiments) 124, and a message assembler 126. The analog front end has a linear gain across the frequency range of the channel to which it is tuned (in the case of a wideband receiver) or across a suitable IF bandwidth (in the case of a narrowband receiver). In embodiments, the A/D converter 116 provides quadrature, digital "IQ" data. These functions can be implemented as discrete components or, for example, as a "system on a chip" (SOC).

In addition to these modules, at least four more modules/functions are included in the embodiment of FIG. 2.

Digital Test Signal Generator 202—This function generates a digital representation of a known modulated signal. In similar embodiments, the digital test signal is separately generated and is stored in a non-volatile memory (not shown). Because the test signal is digital, its "amplitude" is precisely known.

Digital Signal Gain Control 204—This function adjusts the level of the desired signal from the digital test signal generator 202 or memory and provides it to the modulator. In embodiments, the digital signal gain control 204 simply multiplies the digital test signal by a specified gain factor. Since the test signal is digitally generated and processed, it is fully and precisely characterized. Accordingly, there is no need, according to the present disclosure, for calibration of the test signal amplitude. As shown in FIG. 2, in embodiments the digital test signal is added to digitized noise and interference by a "signal combiner" (not shown), which may be included in the demodulator 120 or in another module such as the channelizer 116 or data correlator 120, or may be provided as a separate module.

Correlation Statistics Generator 206—Depending on the type of modulation and waveform used, the correlation statistics generator 206 can determine the ability of the data correlator 122 to provide known correlated output bits based on the DSSS inputs. The resulting bit error rate (BER) "score" indicates how closely the known digital signal input matches the output of the data correlator 122, and is a measure of the SNIR of the channel.

Message Error Rate Calculator 208—Similar to the correlation statistics generator 206, the message error rate calculator 208 compares the "received" message that is output by the message assembler 126, expressed for example as decrypted bits or symbols, with the known "transmitted" message encoded in the digital test signal, to provide a message error rate which can be used in place of, or in combination with, the bit error rate determined by the correlation statistics generator to determine the SNIR. Note that various embodiments include either or both of the correlation statistics generator 206 and the message error rate calculator 208.

Embodiments of the present disclosure use a control function (not shown) to enable the digital test signal generator 202 to provide a digital test signal having a known modulation pattern. This output can then be directed to the digital signal gain control 204, which can adjust the amplitude of the digital test signal to ensure that it is sufficiently close in amplitude to the digitized noise and interference so that an accurate determination of the noise and interference amplitude can be made.

If the digital test signal is too strong, the resulting BER from the data correlator will be too low to allow for an accurate noise+interference determination. Conversely, if the digital test signal is too weak, then the resulting BER from the data correlator will be too high to allow for an accurate noise and interference level determination. Accordingly, depending on the dynamic range of the data correlator 122, it may be necessary to perform a plurality of measurements at various digital test signal amplitudes to ensure that the SNIR is at a level that can be accurately characterized by the BER. For example, the output of the data correlator may be insensitive to the noise and interference level if the SNIR is greater than 10 dB. In this case, if the results indicate that there are few if any correlation errors, then the control system can reduce the amplitude of the digital test signal until the correlation score becomes sensitive to the noise and interference level, so that accurate noise levels can be determined. Similarly, if SNIR is less than a minimum level, such as less than 1 dB, then there may be few if any accurate symbol or data bit detections, such that the output of the data correlator is insensitive to the noise and interference level. In this case, if the results indicate that there are few if any accurate correlations, then the control system can increase the amplitude of the digital test signal until the correlation score becomes sensitive to the noise and interference level In some embodiments that do not include a data correlator, the bit or symbol error rate of the message output is used in place of the BER of the data correlator output to determine a message error rate, and ultimately to determine the SNIR. In other embodiments, both the BER and the message error rate are used.

Figure 3:
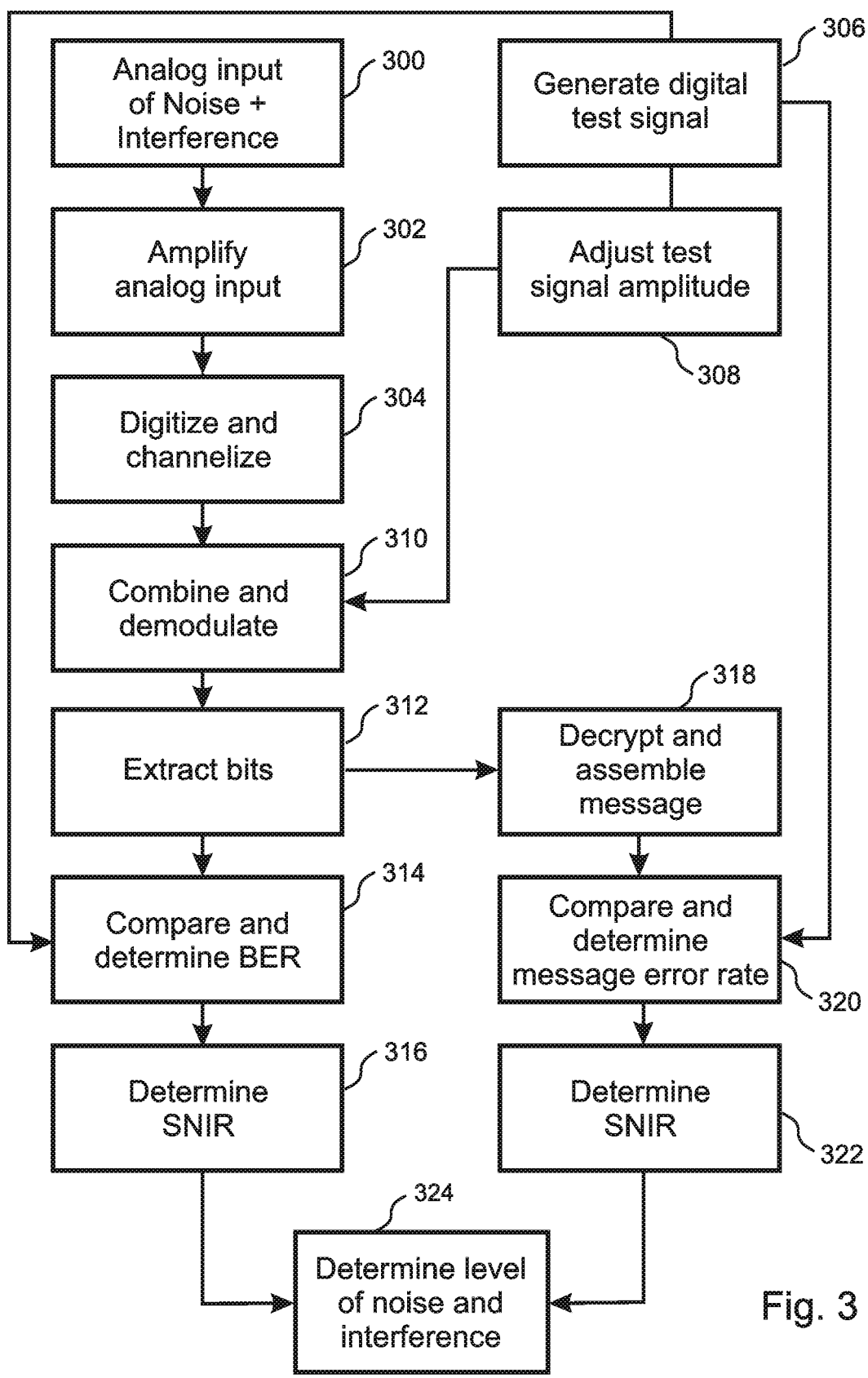
FIG. 3 is a flow diagram illustrating a method embodiment of the present disclosure.

With reference to FIG. 3, in a method embodiment of the present disclosure analog energy is introduced 300 into the signal input of the receiver 200 during a time period when no signal of interest is being transmitted. The analog energy therefore represents noise and/or interference. The analog input is processed 302 by the analog front end 114 of the receiver 200, and then digitized and channelized 304. In parallel, a digital test signal is generated 306, or in similar embodiments retrieved from a non-volatile memory, and the amplitude of the digital test signal is adjusted 308 by a digital signal gain controller 204. The digital test signal is then added 310 by a "combiner" to the digitized noise and interference to form digital input data. Symbols or "chips" are then extracted by the demodulator 120 from the digital input data, after which data bits are extracted 312 by the data correlator 122 from the symbols. The extracted data bits are then compared 314 by the correlation statistics generator 206 with the known message bits of the digital test signal to determine the bit error rate (BER). The BER is then compared to a known performance curve of BER vs. SNIR to determine the SNIR 316 for the channel in which the noise and interference was received.

Meanwhile, the extracted bits 312 are decrypted if necessary, and the message is assembled from the bits 318. In embodiments, the extracted message is then compared with the known message content of the digital test signal 320 and a message error rate is used as a basis to determine the SNIR 322. Finally, either or both determination of the SNIR is/are used to determine the level of noise and interference that is present in the channel 324. In embodiments, the receiver 200 is then shifted to another frequency channel, and the method as illustrated in FIG. 3 is repeated. This process can be continued until the noise and interference has been characterized in all of the available channels, at which point the channel with the lowest noise and interference can be selected for message exchange. Alternatively, the process can be halted as soon as a channel is identified that has a noise level below a specified maximum. Instead or in addition, an appropriate transmission power level and/or transmission rate can be selected so as to ensure successful communication over the selected communication channel.

It should be noted that FIGS. 2 and 3 both illustrate embodiments where the SNIR is determined both from the BER as determined from the output of the data correlator 120 and also from the message error rate based on the "received" message that is produced by the message assembler 126. Embodiments incorporate either or both of these methods.

The foregoing description of the embodiments of the disclosure has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the disclosure to the precise form disclosed. Many modifications and variations are possible in light of this disclosure.

Although the present application is shown in a limited number of forms, the scope of the disclosure is not limited to just these forms, but is amenable to various changes and modifications without departing from the spirit thereof. The disclosure presented herein does not explicitly disclose all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

We claim:

1. A wireless receiver configured to receive a transmitted message, the receiver comprising:
   an analog input;
   a digitizer configured to digitize analog energy that enters the receiver via the analog input, said digitized analog energy being digitized noise and interference when a signal of interest is not included in the analog energy;
   a digital test signal source, configured to provide a digital test signal having a known amplitude and message content;
   a digital signal gain controller, configured to adjust the digital test signal amplitude to a test input amplitude;
   a signal combiner, configured to combine the adjusted digital test signal with the digitized noise and interference so as to create digital input data;
   a data correlator configured to extract transmitted message bits from the digital input data; and
   a correlation statistics generator configured to determine a bit error rate of the symbols extracted by the data correlator by comparing the bits extracted by the data correlator with the known message content of the digital test signal.

2. The receiver of claim 1, further comprising a channelizer configured to limit the digitized analog energy to digitized energy that falls within a selected receiver channel.

3. The receiver of claim 1, further comprising a demodulator configured to extract symbols from the digital input data, said transmitted message bits being encoded in the symbols.

4. The receiver of claim 1, further comprising a decryptor configured to decrypt the data bits extracted by the data correlator.

5. The receiver of claim 1, further comprising a message assembler configured to reconstruct a received message from the data bits extracted by the data correlator, the received message at least approximating the transmitted message.

6. The receiver of claim 5, further comprising a message error rate calculator configured to determine a message error rate of the received message by comparing the received message with the known message content of the digital test signal.

7. The receiver of claim 1, wherein the digital test signal source is a digital test signal generator that generates the digital test signal.

8. The receiver of claim 1, wherein the digital test signal source is a memory configured for storing a non-transient copy of the digital test signal.

9. The receiver of claim 1, wherein the digitizer is a quadrature digitizer.

10. A method for communicating over a wireless communication channel in which noise and interference are present, the method comprising:
   a) selecting an available communication channel;
   b) during a time period when no signal of interest is present in the selected communication channel, receiving analog noise and interference as an analog input;
   c) digitizing the analog input to create a digitized noise and interference;
   d) combining the digitized noise and interference with a digital test signal to form digital input data, the digital test signal being adjusted to a specified amplitude and having a known message content encoded as known message bits;
   e) extracting message information from the digital input data;
   f) determining a signal to noise and interference ratio (SNIR) of the digital input data by comparing the extracted message information with the known message content of the digital test message;

g) determining a noise and interference level of the selected channel from the determined SNIR;

h) if the determined SNIR does not meet a specified SNIR criterion, changing the specified amplitude of the digital test signal and repeating steps a) through g) until the SNIR meets the SNIR criterion; and i) at least one of:
   i.) if there are a plurality of available communication channels, repeating steps a) through g) until a channel selection criterion is satisfied, selecting a one of the plurality of available communication channels according to the determined noise and interference levels, and transmitting a message over the selected communication channel; and
   ii) transmitting a message at a transmission power and/or a transmission rate that is/are selected according to the determined noise and interference level of the selected communication channel.

11. The method of claim 10, wherein step e) comprises obtaining received data bits from the digital input data, and step f) comprises determining a bit error rate by comparing the received data bits with the known message bits, and determining the SNIR from the bit error rate.

12. The method of claim 10, wherein step e) comprises assembling a message from the digital input data, and step f) comprises determining the SNIR from a comparison of the assembled message with the known message content of the digital test message.

13. The method of claim 10, wherein step i) includes repeating steps a) through h) for each of the plurality of available communication channels, and step j) includes selecting a channel having a lowest noise and interference level from among the plurality of available communication channels.

14. The method of claim 10, wherein the selection criterion includes a designated maximum level of noise and interference, and step i) includes repeating steps a) through h) until a level of noise and interference for a selected channel is determined to be below the designated maximum level.

15. The method of claim 10, further comprising channelizing the digitized noise and interference between steps c) and d), wherein said channelizing limits the digitized noise and interference to noise and interference that falls within the selected receiver channel.

16. The method of claim 10, wherein step e) includes extracting symbols from said digital input data by demodulating the digitized noise and interference.

17. The method of claim 16, further comprising extracting message bits from the symbols by correlating the symbols.

18. The method of claim 17, further comprising assembling a message from the message bits.

19. The method of claim 18, further comprising decrypting the message bits before extracting the message.

20. The method of claim 10, wherein the SNIR criterion is that the SNIR must be between 1 dB and 10 dB.

* * * * *